July 29, 1958  A. J. KASEVICH  2,844,976
DE-BURRING DEVICE
Filed Jan. 21, 1955
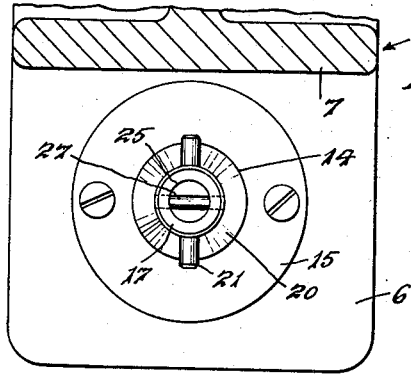
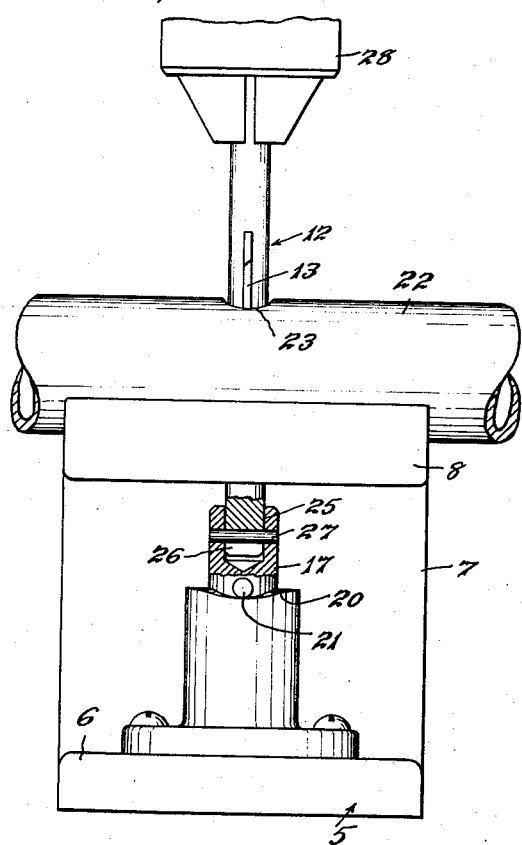
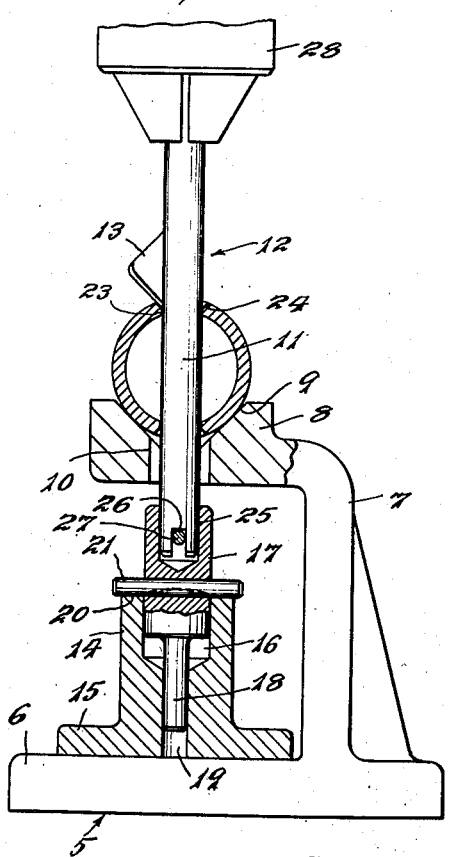
INVENTOR.
ALEXANDER J. KASEVICH.
BY
Louis V. Lucia
ATTORNEY.

United States Patent Office 2,844,976
Patented July 29, 1958

2,844,976
DE-BURRING DEVICE

Alexander J. Kasevich, Manchester, Conn., assignor to The United Tool and Die Company, Hartford, Conn.

Application January 21, 1955, Serial No. 483,310

2 Claims. (Cl. 77—4)

This invention relates to a de-burring device and more particularly to a device for de-burring the edges of holes in a piece of work.

It is well known that it is very difficult to de-bur the edges of holes in a piece of work having irregular outer surfaces, such as the curved surfaces of rods, tubes and the like, due to the fact that de-burring tools, which rotate on a fixed plane, will engage only the high spots of the hole edge and miss the low spots; thereby resulting in an uneven de-burring which is very unsatisfactory. This frequently necessitates that the piece be de-burred by hand, rather than by a machine tool, and thereby results in a costly operation, particularly when de-burring of holes is done on a volume production basis.

It is therefore an object of this invention to provide a device which will permit the use of a machine tool for de-burring of holes in irregular surfaces in such a manner that the said edges will be de-burred evenly around their entire distance regardless of any irregularity with relation to the planes of said edges.

A further object is to provide a device which will facilitate locating of a workpiece in position to receive a de-burring tool.

Further objects and advantages of this invention will be more clearly understood from the following description and from the accompanying drawings in which:

Fig. 1 is a sectional view on line 1—1 of Fig. 2.

Fig. 2 is a front view, partly in section, of a de-burring device embodying my invention.

Fig. 3 is a side view of said device with parts being shown in central vertical section.

As shown in the drawings, my improved de-burring device includes a base 5 having a supporting table 6 and an upstanding wall 7 having an overhanging work supporting portion 8.

The said supporting portion has a V groove 9 therein for receiving circular bars or tubes to be de-burred and an opening 10 extends through the bottom of said V groove to receive the shank 11 of a conventional de-burring tool 12, such as commonly having a de-burring cutter blade 13 extending therefrom which is biased outwardly of the shank by a suitable spring not shown.

In accordance with the present invention, there is provided a guide member 14 which preferably has a base 15 by means of which it is secured upon the table 6. The said member 14 has an axial guide hole 16 which slidably receives a guide plunger 17 having a guide extension 18 which is slidable in a reduced guide portion 19 that extends from the opening 16.

The upper surface of the guide member 14, which forms the marginal edge portion of the opening 16, is shaped to provide an annular guide cam surface 20 that conforms with the shape of the edge which is to be de-burred by the blade 13 and the guide plunger 17 is provided with a guide pin 21 that extends horizontally through said plunger and rests upon the cam surface 20.

As shown in the drawings, the cam surface 20 is shaped to conform with the contour of the workpiece 22 which is in the form of a tube having a hole 23 extending therethrough and the edge of said hole is being de-burred to provide a bevelled edge surface 24.

In the form shown, the shank of the de-burring tool extends through the hole 23 which is to be de-burred and then projects downwardly through the opening 10. The said shank has a lower end portion which is adapted to be inserted into an axial hole 25 in the guide member 17 and has a notch 26 therein which receives a rotating pin 27 that extends across the said axial hole.

In the use of my improved de-burring device, the work tool 12 is secured in a suitable chuck 28 by means of which it is rotated in a suitable machine, such as a drill press or the like.

The workpiece 22 is then placed in the V groove 9 with the hole 23 being located under the end of the shank 11. The said de-burring tool is then lowered through the hole 23 until the notch 26 engages with the rotating pin 27. At that time, the de-burring blade 13 will yieldingly engage the edge of the hole 23 which is to be de-burred. Rotation of the de-burring tool will then rotate the guide member 17 and thus rotate the guide pin 21 over the annular cam surface 20 and cause the said de-burring tool to be raised and lowered by said cam surface so that the cutting edge of the blade 13 will engage the edge of the hole being de-burred and be moved vertically by the cam surface to correspond with the formation of the said edge. Therefore, the said cam surface 20 will maintain the cutting edge of the blade 13 at the proper height during its rotation to cut the edge being de-burred for the same depth around the entire circumference of the hole regardless of any planar irregularity in the said edge.

It will be understood, from the above description, that during the de-burring operation, the de-burring tool will be moved up and down by the cam surface 20 so as to maintain the cutting edge of the blade 13 always in proper de-burring contact with the edge of the hole being de-burred.

It is necessary that the formation of the cam surface 20 be such as to correspond to the formation of the outer surface of the workpiece, or to the shape of the edge of the hole which is to be de-burred, and therefore different guide members 14 may be installed in the said device having cam edges 20 which will accommodate particular shapes of workpieces in which the holes are to be de-burred.

It will be noted that the relation between the rotating pin 27, the notch 26 and the guide pin 21 is such that the cutting blade 13 will always be in engagement with a portion of the edge which is being de-burred that corresponds to the portion of the cam surface 20 which is in engagement with the guide pin 21. Therefore, no particular attention is required on the part of the operator to insure proper engagement between the shank 11 and the guide plunger 17 when the de-burring tool is inserted into the hole in the workpiece.

I claim:

1. A de-burring device including a base, a work supporting portion on said base having a hole extending therethrough, a guide member mounted on said base under said work supporting portion in axial alignment with said hole, an axial guide hole in said guide member, an irregular guide surface upon said guide member extending along the edge of said guide hole and conforming to the formation of the edge of a hole to be de-burred on a workpiece, a guide plunger slidable in said guide hole in said guide member, a projection on said plunger engageable with said guide surface, and connecting means in said guide plunger for axially receiving the end of a de-burring tool to cause rotation of said guide plunger by said de-burring tool and thereby causing axial movement of said de-burring tool in accordance with the formation of said edge of the hole in the workpiece.

2. A de-burring device including a base having a supporting surface thereon, an upright portion on said base having an overhanging work supporting portion, a V groove in said work supporting portion adapted to receive a workpiece, said overhanging portion having a hole extending downwardly through the bottom of said V groove, a guide member mounted upon said supporting surface in axial alignment with said hole, a hole in said guide member, a plunger slidable in said hole of said guide member, a hole in said plunger in axial alignment with said hole in said bottom of said V groove, a rotating pin extending across said hole in said plunger and adapted to engage a notch in the end of a de-burring tool extending downwardly through said hole in said bottom of said V groove so as to rotate said plunger, a guide pin extending through and projecting from the opposite sides of said plunger, and a guide surface on said guide member engageable by said guide pin for moving said guide plunger in accordance with the formation of said guide surface and thereby axially moving said de-burring tool during the rotation thereof.

References Cited in the file of this patent

UNITED STATES PATENTS

| | | |
|---|---|---|
| 2,352,348 | Seme | June 27, 1944 |
| 2,476,211 | Muller | July 12, 1949 |
| 2,521,947 | Reeves | Sept. 12, 1950 |
| 2,675,602 | Kern | Apr. 20, 1954 |

FOREIGN PATENTS

| | | |
|---|---|---|
| 258,084 | Switzerland | Apr. 16, 1949 |
| 645,533 | Great Britain | 1950 |